(12) United States Patent
Raz et al.

(10) Patent No.: US 9,600,403 B1
(45) Date of Patent: Mar. 21, 2017

(54) METHOD AND SYSTEM FOR CREATING FUNCTIONAL MODEL OF TEST CASES

(71) Applicant: International Business Machines Corporation, Armonk, NY (US)

(72) Inventors: Orna Raz, Haifa (IL); Randall L Tackett, Rifton, NY (US); Paul A Wojciak, Poughkeepsie, NY (US); Marcel Zalmanovici, Kiriat Motzkin (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 14/839,986

(22) Filed: Aug. 30, 2015

(51) Int. Cl.
*G06F 11/00* (2006.01)
*G06F 11/36* (2006.01)
(52) U.S. Cl.
CPC ...... *G06F 11/3684* (2013.01); *G06F 11/3692* (2013.01)
(58) Field of Classification Search
USPC ........................................................ 714/25
See application file for complete search history.

(56) References Cited

U.S. PATENT DOCUMENTS

| 8,756,460 B2 | 6/2014 | Blue et al. |
| 8,806,450 B1 | 8/2014 | Maharana et al. |
| 2011/0083121 A1* | 4/2011 | Dixit et al. ......... G06F 11/3684 717/124 |
| 2013/0275939 A1* | 10/2013 | Tzoref-Bill ......... G06F 11/3676 717/105 |
| 2014/0012560 A1* | 1/2014 | Tzoref-Brill ........ G06F 11/3676 703/22 |
| 2014/0282411 A1 | 9/2014 | Liemandt et al. |

FOREIGN PATENT DOCUMENTS

WO 2013087982 6/2013

OTHER PUBLICATIONS

G. Parkavi., "HTT: A Novel Technique for Automatic Test Case Selection Designed for Regression Testing", can be found at: http://www.citeulike.org/user/greger/article/12904998, 2013.
Chandana Bharati., "Analysis of Different Regression Testing Approaches", International Journal of Advanced Research in Computer and Communication Engineering, vol. 2, Issue 5, May 2013.

(Continued)

*Primary Examiner* — Sarai Butler
(74) *Attorney, Agent, or Firm* — Ziv Glazberg (57) ABSTRACT

A method, product and apparatus for creating functional model of test cases. The method comprising obtaining a set of test cases, wherein each test case of the set of test cases comprises free-text; defining one or more tags, wherein each tag of the one or more tags is associated with a query that is configured, when applied, to determine possession of the tag with respect to a test case based on the free-text; applying the queries on the set of test cases to determine possession of the of the one or more tags for each test case; and generating a functional model based on the set of test cases, wherein the functional model comprising for each tag of the one or more tags, a corresponding functional attribute.

18 Claims, 3 Drawing Sheets

(56) References Cited

OTHER PUBLICATIONS

Monthawan Raengkla., "A Test Case Selection from Using Use Case Description Changes", Proceedings of the International MultiConference of Engineers and Computer Scientists 2013 vol. I, IMECS 2013, Mar. 13-15, 2013, Hong Kong.

S. Yoo, M. Harman., "Regression Testing Minimisation, Selection and Prioritisation : A Survey", Software Testing, Verification and Reliability, Softw. Test. Verif, Reliab.2007.

\* cited by examiner

METHOD AND SYSTEM FOR CREATING FUNCTIONAL MODEL OF TEST CASES

TECHNICAL FIELD

The present disclosure relates to testing in general, and to testing using functional models of test suites, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During the testing phase, a sample of all possible behaviors of the computerized device, also referred to as a System Under Test (SUT) or target system, is inspected.

The testing phase may be planned, such as by determining which test cases be executed. Additionally or alternatively, given a test suite, a reduction of the size of the test suite may be desired without reducing the coverage of the selected subset. It is known that a functional coverage model, also referred to as a "functional model", may be useful for such tasks. The functional coverage model defines a triplet: functional attributes, a domain for each functional attribute, and a set of restrictions. The functional attributes may be any attribute of the SUT, such as for example a type of web browser being used, an underlying Operating System, a number of threads operating, whether the output was printed. The domains may define for each attribute a set of possible values. For example, the web browser may be Microsoft® Internet Explorer®, Google® Chrome®, or Mozilla Firefox™. Similarly, the operating system may be Microsoft® Windows®, or Linux™. The cross-product of the different combinations of the attributes defines a functional coverage test-space. The test-space comprises a set of coverage tasks, each representing functional requirements to be tested: one requirement per functional attribute, and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the cross-product test-space comprises sixty (60) coverage tasks. In some exemplary embodiments, a set of test cases are represented by a set of coverage tasks, each corresponding to a different test case.

The functional coverage model may further comprise a set of restrictions defining a series of values of different attributes that may not appear together. For example, consider a functional coverage defining two attributes: ACTION and USER. The ACTION attribute may be each of the following values: RETRIEVE, STORE, and MODIFY PERMISSION. The USER attribute may be each of the following values: ADMIN, USER, GUEST. In some cases, a guest user cannot modify permission. A restriction may be defined to indicate that the couple (GUEST, MODIFY PERMISSION) is not a valid couple. The fact that a trace does not comprise an entry covering a coverage task that includes the couple does not affect the functional coverage. In other words, all possible coverage tasks—which together form the maximal possible coverage with respect to a functional coverage—do not include any coverage task that comprises the restricted couple. It will be understood that restrictions may be defined with respect to a combination of values of different attributes, and not necessarily with respect to a complete tuple of values. Furthermore, the restriction may be any constraint on combination of values, which may be represented using a Boolean formula over the functional attributes and associated values.

BRIEF SUMMARY

One exemplary embodiment of the disclosed subject matter is a computer-implemented method comprising: obtaining a set of test cases, wherein the set of test cases are useful for testing a target system, wherein the set of test cases are stored electronically, wherein each test case of the set of test cases comprises free-text; defining one or more tags, wherein each tag of the one or more tags is associated with a query, wherein the query is configured, when applied, to determine possession of the tag or lack thereof with respect to a test case based on the free-text; applying queries associated with the one or more tags on the set of test cases to determine possession of the of the one or more tags for each test case of the set of test cases; and generating a functional model based on the set of test cases, wherein the functional model comprising for each tag of the one or more tags, a corresponding functional attribute, wherein the functional model comprising for each test case of the set of test cases, a coverage task, wherein a value of a functional attribute in a coverage task is indicative of possession of the corresponding tag by a corresponding test case.

Another exemplary embodiment of the disclosed subject matter is a computerized apparatus having a processor, the processor being adapted to perform: obtaining a set of test cases, wherein the set of test cases are useful for testing a target system, wherein the set of test cases are stored electronically, wherein each test case of the set of test cases comprises free-text; defining one or more tags, wherein each tag of the one or more tags is associated with a query, wherein the query is configured, when applied, to determine possession of the tag or lack thereof with respect to a test case based on the free-text; applying queries associated with the one or more tags on the set of test cases to determine possession of the of the one or more tags for each test case of the set of test cases; and generating a functional model based on the set of test cases, wherein the functional model comprising for each tag of the one or more tags, a corresponding functional attribute, wherein the functional model comprising for each test case of the set of test cases, a coverage task, wherein a value of a functional attribute in a coverage task is indicative of possession of the corresponding tag by a corresponding test case.

Yet another exemplary embodiment of the disclosed subject matter is a computer program product comprising a computer readable storage medium retaining program instructions, which program instructions when read by a processor, cause the processor to perform a method comprising: obtaining a set of test cases, wherein the set of test cases are useful for testing a target system, wherein the set of test cases are stored electronically, wherein each test case of the set of test cases comprises free-text; defining one or more tags, wherein each tag of the one or more tags is associated with a query, wherein the query is configured, when applied, to determine possession of the tag or lack thereof with respect to a test case based on the free-text; applying queries associated with the one or more tags on the set of test cases to determine possession of the of the one or more tags for each test case of the set of test cases; and generating a functional model based on the set of test cases, wherein the functional model comprising for each tag of the one or more tags, a corresponding functional attribute, wherein the functional model comprising for each test case of the set of test cases, a coverage task, wherein a value of a functional attribute in a coverage task is indicative of possession of the corresponding tag by a corresponding test case.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to create functional models from existing test suites.

In some cases, the functional model may be useful for test selection. Selecting a subset of tests to run is a requirement in many environments. This is true both for regular releases and for service packs—defect patches and upgrades.

These tests are often unstructured—they are textual descriptions to be manually executed by a tester. For such manual tests, test execution frameworks that rely on code changes are inapplicable.

Often, schedules are very tight and there are not enough resources to run an entire regression test. It is important to identify those tests that are most relevant to the released features so that at least those tests can be run.

In some exemplary embodiments, it may be desired to provide for test selection even in the absence of some a-priori measure of coverage, such as code coverage or data flow coverage. Currently, when such coverage measures do not exist—people resort to what is sometimes termed 'ad hoc' or 'random' techniques—making selections based on 'hunches' or taking into account just the number of tests to execute (e.g., executing the first n tests in the list).

One technical solution is to create a functional model based on a test cases that are provided in free-text. A query, such as a text search query, is defined and the results of which are used to define a value of a Boolean functional attribute. In some cases, test cases that match the query may be referred to as being tagged with a tag corresponding the functional attribute. The functional model may then be defined using the tags. In case a test case possess the tag (e.g., the query associated with the tag included the test case in the results), the value of the corresponding Boolean functional attribute is true. Otherwise, the value is set to false.

The queries may be defined once and re-used on new test cases which are added to the test suite later on.

In some exemplary embodiments, additional queries may be defined to define hierarchal tags whose value depends on whether the test cases possess a certain tag. For example, the queries may define tags such as COUPLING_FACILITY, BACKUP, and REDUNDANCY. The additional query may define the tag COPULING_FACILITY_RESILIENCY which includes any test case that is tagged with COUPLING_FACILITY and at least one of BACKUP and REDUNDANCY. The hierarchal tag, which may also be referred to as a meta tag, may be deemed as relating to a testing concept of a higher abstraction level. The meta tag may correspond to a functional attribute in the model. In some exemplary embodiments, the functional attribute may have a Boolean domain. However, in some cases, the value of the functional attribute may be a set of tags which resulted in the test case being tagged with the meta tag. In one test case, the value may be {COUPLING_FACILITY, BACKUP}, in another it may be {COUPLING_FACILITY, REDUNDANCY} and in a yet another test case the value may be {COUPLING_FACILITY, BACKUP, REDUNDANCY}.

In some exemplary embodiments, the queries may be defined based on user input, such as providing a query formula. Additionally or alternatively, the user may review results of each query operation to manually verify and optionally modify tagging determined by the query.

In some exemplary embodiments, the queries may be defined automatically based on topic summarization of the test cases. Topic summarization may excerpt from the free-text of the test cases topics that are common to the test cases. Additionally or alternatively, keywords may be determined by the topic summarization (by extracting the keywords from the text, by abstractive methods which identify keywords relevant to the text which may not appear in the text itself, or by any other method). The topics may be utilized in defining a query. Each test case that includes a topic T, a keyword K, or the like, may be identified and tagged with a corresponding tag, which corresponds to a functional attribute. It will be noted that the disclosed subject matter is not limited to a specific form of Natural Processing Language (NPL) process and the term topic summarization does not limit the scope of the disclosed subject matter and may include any NPL process that provides the same output.

In some exemplary embodiments, the disclosed subject matter may utilize clustering techniques to reduce size of the test suite. In some exemplary embodiments, clustering may be performed on the test cases prior to being tagged and based on the free-text thereof. A cluster of test cases may be analyzed in accordance with the disclosed subject matter.

Additionally or alternatively, clustering may be performed on the test cases after being tagged. The clustering may be performed based on the tags. A cluster of test cases may be selected for analysis, such as for selecting a subset thereof in test selection, for test planning using Combinatorial Test Design (CTD), or the like.

One technical effect of the disclosed subject matter is in providing an initial functional model that is based on a given test suite without requiring an expert. The functional model may be an initial model which is used as a basis for defining the complete functional model. The complete functional model may be manually determined by a user, such as by introducing additional functional attributes, by introducing restrictions, or the like.

In some exemplary embodiments, the fact that the user is provided with an initial functional model may allow the user to complete the functional model in shorter time span. Also, the disclosed subject matter may be user-friendly in defining the functional model as the user may be more open to defining tags than functional attributes.

Another technical effect is allowing for an automatic or semi-automatic manner of defining a functional model for a test suite that is comprised of non-executable code but rather free-text, such as free-text describing operation the user is required to perform in testing, a free-text describing an input file to the test (for example, in case medical imaging is testing, a test case may be an image and a free-text describing the content of the image), or the like.

Figure 1A:
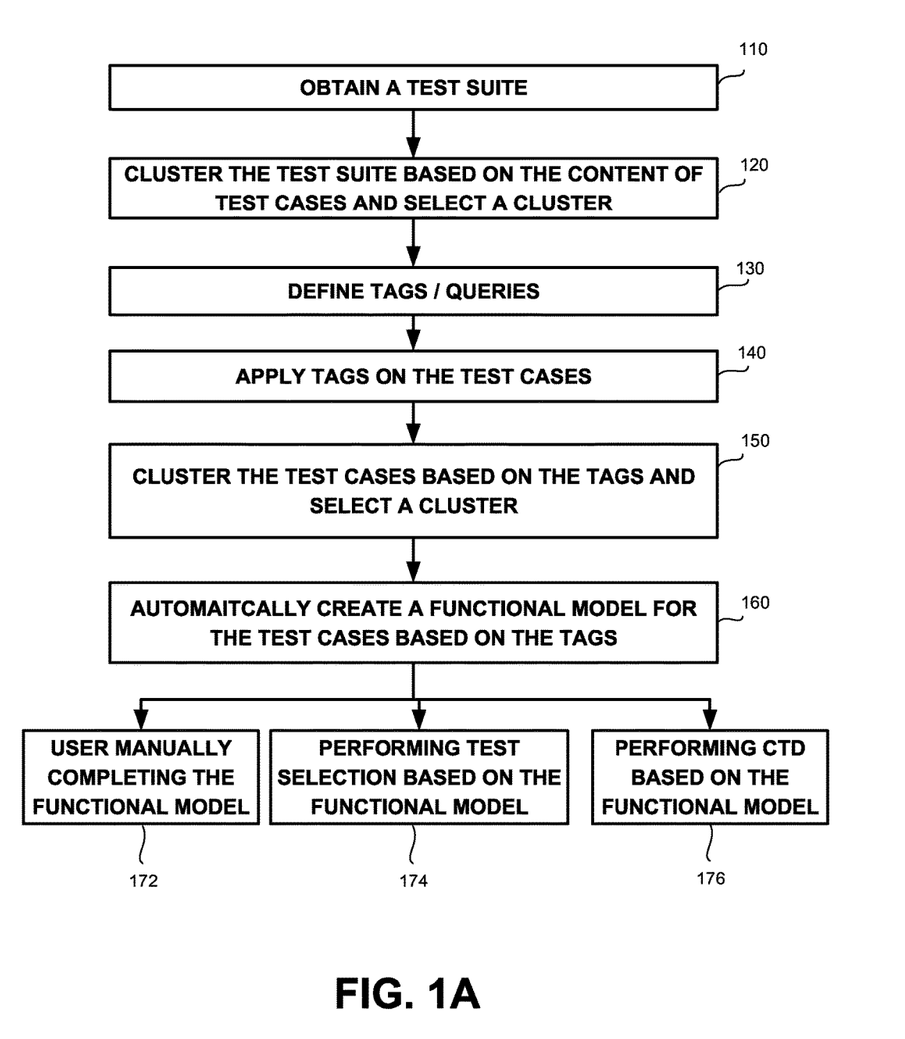
FIG. 1A shows a flowchart diagram of a method, in accordance with some exemplary embodiments of the disclosed subject matter.

Referring now to FIG. 1A showing a flowchart diagram of a method, in accordance with some exemplary embodiments of the subject matter.

In Step 110, a test suite is obtained. The test suite may comprise test cases, each of which comprising free-text information. In some exemplary embodiments, the test cases may not include formal definitions describing the testing operation or results thereof. In some exemplary embodiments, the free-text may include a description of operation to be performed manually during testing to test a target system. Additionally or alternatively, the free-text may include a description of input to be provided to the target system, such as an image, or an output expected from the target system, such as the analysis results of the image. In some exemplary embodiments, the test cases may be semi-structured, comprising additional structured elements in addition to the free-text, or the like. As an example, some test cases may comprise structured information, such as but not limited to code, in addition to non-structured, free-text information. In some cases, the free-text may comprise a description of the structured information, comments, additional informal instructions, or the like.

In some exemplary embodiments, the test suite may be a test suite used in regression testing and collected and increased over a long period of time, e.g., years.

In Step 120, the test cases of the test suite may be clustered into clusters. The cluster analysis may be performed based on the free-text of the test cases so as to include in a same cluster tests that have similar free-text. In some exemplary embodiments, a test case may be included in more than a single cluster. The clustering may be performed in order to reduce a size of the test suite to be analyzed and instead focus on a single cluster comprising a reduced number of tests that are similar to one another. After the clustering is performed, a cluster is selected for analysis. In some exemplary embodiments, each cluster may be analyzed independently.

In Step 130, tags may be defined. A tag may be defined by providing a query that can be performed by a query engine on a set of test cases, and which returns a subset of the test cases that hold a certain criteria. The query may be defined manually or automatically. In some exemplary embodiments, a user may define a text query, a keyword search, or the like, to used as the definition of the query of the tag. Additionally or alternatively, the tag may be determined automatically such as based on a topic determined by topic summarization of the test cases. In some exemplary embodiments, the automatically defined tags may be manually reviewed by the user who may accept, reject or modify each such tag and corresponding query.

In some exemplary embodiments, meta tags may be defined. Meta tags may be defined as a composition of tags with or without additional requirements from the test case (e.g., additional text search criteria). Meta tags may be used to define a hierarchy of tags.

In Step 140, the tags may be applied on the test cases. Applying the tags may comprise executing the query for the tags and determining a result set. Each test case comprised in the result set may be determined as to be "tagged" by the tag. In some exemplary embodiments, a user may review results of each query execution and modify the result, such as by adding test cases that were not automatically returned by the query to the set of tagged test cases, removing test cases that were returned by the query from the set of tagged test cases, or the like.

In Step 150, test cases may be clustered based on their tagging so as to include in a same cluster test cases having similar sets of tags. In some cases, the clustering may be indifferent of the free-text and be determined solely based on the tags. A cluster may be selected for further analysis. In some cases, each cluster may be analyzed iteratively and independently.

In Step 160, a functional model may be created automatically for the set of test cases being analyzed. In some exemplary embodiments, a tag may correspond to a functional attribute having a Boolean value. The value may be set to either true in case the test case possesses the tag and to false in case the test case does not possess the tag. Additionally or alternatively, meta tags may correspond to functional attributes which may have Boolean value or alternatively have a value that is either indicative of lack of possession of the meta tag or indicative of the tags that are possessed by the test case which are associated with the meta tag (e.g., the meta tag query checks for their possession in order to determine possession of the meta tag).

In some exemplary embodiments, the functional model defined automatically in Step 160 is based on the tags and defines a coverage task for each test case. In some exemplary embodiments, the functional model that is automatically defined may not comprise any restrictions which may not be inferred from the existing test suite.

The functional model may be used in various ways.

In some exemplary embodiments the functional model may be provided to a user for review, update and completion (172). In such a case, the user, for example, may add new functional attributes, modify coverage tasks, and define restrictions.

In some exemplary embodiments, the functional model may be used for performing test selection (174). Test selection may be aimed at reducing a number of tests without compromising coverage of the reduced test suite. Test selection may also be aimed at running only a subset of tests that is currently relevant. The test selection may be performed by selecting coverage tasks that if removed do not reduce a coverage metric below a desired coverage goal.

In some exemplary embodiments, the functional model may be used for performing Combinatorial Test Design (CTD) (176) to plan a testing phase of the target system.

Figure 1B:
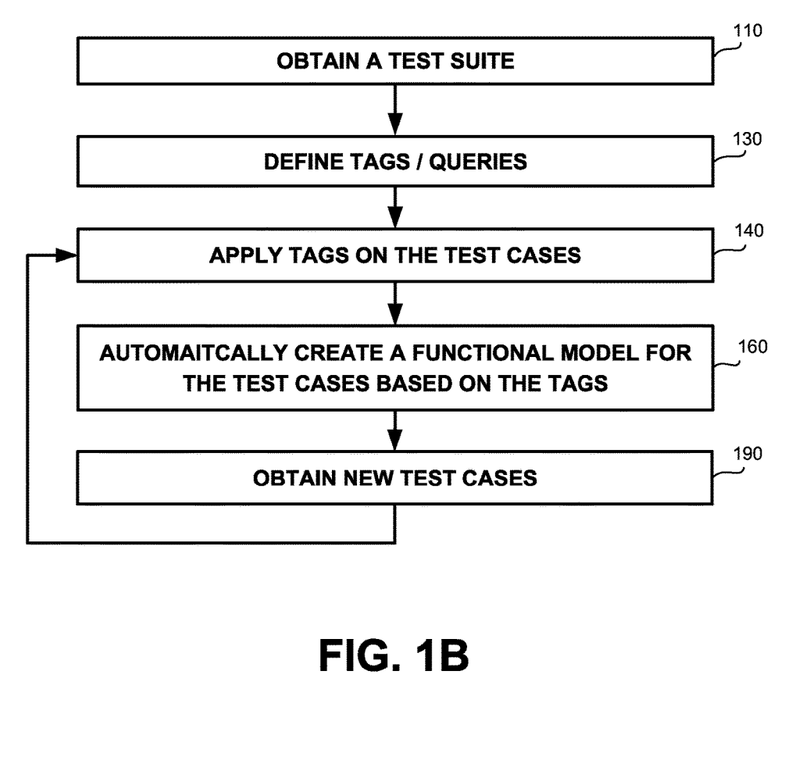
FIG. 1B shows a flowchart diagram of a method, in accordance with some exemplary embodiments of the disclosed subject matter.

Referring now to FIG. 1B showing a flowchart diagram of a method, in accordance with some exemplary embodiments of the subject matter.

After a model is created (160), new test cases may be obtained (190). The new test cases may be test cases added in view of a new bug fix, a new feature addition, or due to any other reason. In some cases, over the life span of the target system, many test cases are added iteratively. The existing tag definitions may be applied on the new test cases (140), thereby tagging the new test cases. The functional model may be updated accordingly (160) to introduce new coverage tasks corresponding to the new test cases based on tags determined for them.

Figure 2:
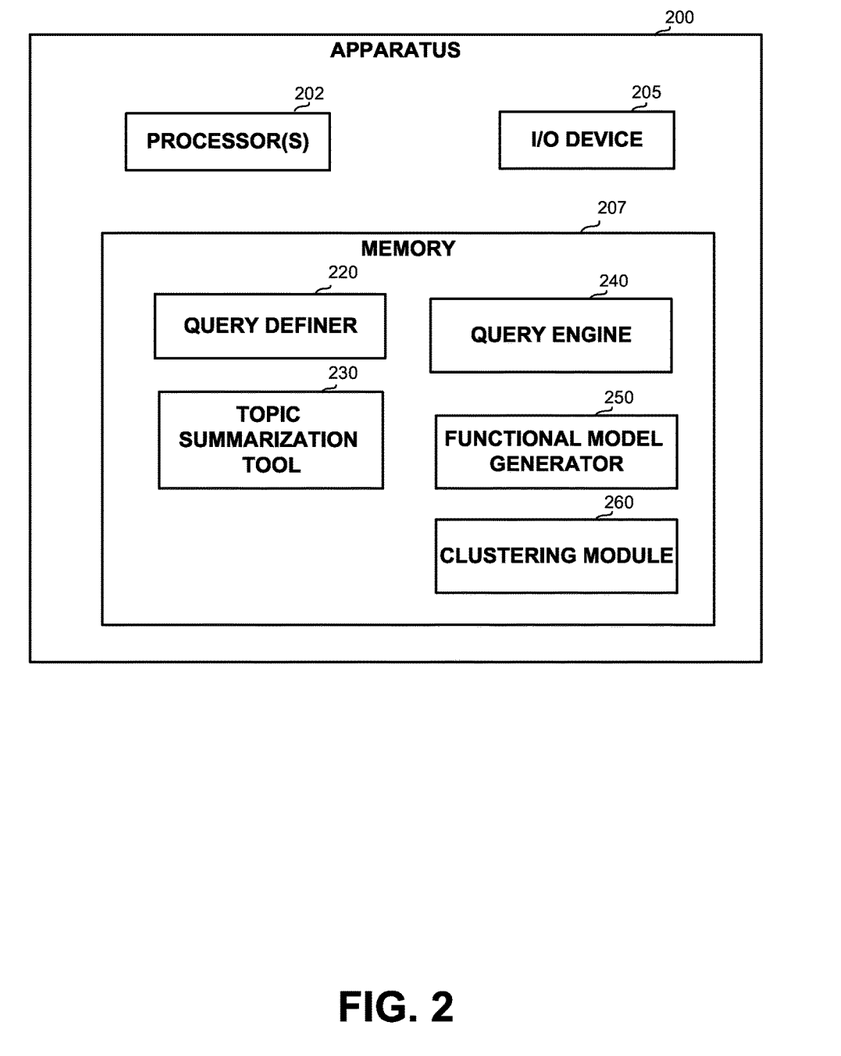
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter.

In some exemplary embodiments, Apparatus 200 may comprise one or more processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) Module 205. I/O Module 205 may be utilized to receive test cases that are electronically stored, or the like. I/O Module 205 may be used to provide user interface for a user, such as for viewing tagging results, amending functional model, or the like.

In some exemplary embodiments, Apparatus 200 may comprise a Memory 207. Memory 207 may be a hard disk drive, a Flash disk, a Random Access Memory (RAM), a memory chip, or the like. In some exemplary embodiments, Memory 207 may retain program code operative to cause Processor(s) 202 to perform acts associated with any of the subcomponents of Apparatus 200.

Query Definer 220 may be configured to define queries in accordance with the disclosed subject matter. In some exemplary embodiments, Query Definer 220 may be configured to receive input from a user defining the query, such as a text search query, a condition relating to possession of tags, or the like. Additionally or alternatively, Query Definer 220 may utilize Topic Summarization Tool 230 to define queries automatically based on topics identified by Topic Summarization Tool 230. In some exemplary embodiments, Query Definer 220 may be used to define tags and meta tags.

Query Engine 240 may be configured to execute a query on a set of test cases and return a subset holding a requirement defined in the query. Based on the results of executing the query, test cases may be tagged.

Functional Model Generator 250 may be configured to generate a functional model for a set of test cases based on their respective tags. The generated model may comprise a set of functional attributes, each of which corresponding to a different tag.

Functional attributes corresponding to tags may be Boolean functional attributes having a Boolean domain. Functional attributes corresponding to meta-tags may be Boolean functional attributes having a Boolean domain or functional attributes having a domain comprising sets of tags.

Clustering Module 260 may be configured to cluster test cases. Clustering Module 260 may perform clustering based on free-text of the test cases. Additionally or alternatively, Clustering Module 260 may perform clustering based on tags of each test case (e.g., based on values of functional attributes). In some exemplary embodiments, Clustering Module 260 may employ different or same clustering algorithms for different clustering operations.

An Embodiment

In some exemplary embodiments, the disclosed subject matter may enable association of test cases (or data) with concepts by an interface that provides the following functions:

(1) Search for items that match a specified text. This search can be limited to items associated with tags, and to text associated with particular tags.

(2) Mark one or more items in the search result (3) Associate marked items with a tag. The tag may be new or existing.

(4) Associate a tag to an item, and text to the tag. E.g., associate a "complexity" tag to item X, and the text "moderately high" to the "complexity" tag of this item.

Additionally, sequences of search, mark, and tag operations may be recorded, and applied to new data as it becomes available.

An Example

Test case A contains the phrases "coupling facility"; "backup"

Test case B contains the phrases "coupling facility"; "redundancy"

Tags for test case A: COUPLING_FACILITY, BACKUP

Tags for test case B: COUPLING_FACILITY, REDUNDANCY

Meta tag (maps to a concept): All test cases matching the search phrase COUPLING_FACILITY AND (BACKUP OR REDUNDANCY) will be tagged via the tag COPULING_FACILITY_RESILIENCY When a new defect fix comes in, having to do with coupling facility resiliency, the matching tags can be automatically applied.

The identification of the concept for the incoming defect can also be automated, for example via searching for the terms underlying the concept tag (in this case 'coupling facility' AND (backup OR redundancy)

The disclosed subject matter may be used as a method for semi-automatically assisting users in making informal concepts explicit. The concepts are captured to a level in which actions can be based on them. An example of such an action is automated test selection. Another example is automated experiment sample selection. The explicit concepts may further serve as a useful and concrete starting point for creating concept maps, Cartesian product models, and many other forms of formal representation, In practice, even experts may be unable to specify the concepts underlying their informal selection of test cases, yet they may be able to easily apply the disclosed subject matter resulting in capturing these concepts to a level supporting automatic test selection.

In another example, the user may first identify important phrases that characterize what tests are doing. These may also be automatically suggested to the user. The user captures these via tags. For example:

The user adds a tag OS to all the test cases that match the search query "(z/os OR zos OR mvs)".

The user adds a tag CHANNEL to all documents matching the search query "(chdriver OR chdrvr OR channel)".

The user adds a tag OPERATION to all documents matching the search query "(sak AND (exping OR excite OR exdasd))"

The user then combines such tags and additional phrases into higher level 'light concepts'. The user captures these via more tags.

For example: datapush may be related to adapter, action, operation, operating system, and channel. The user adds a tag CONCEPT_DATAPUSH to all documents matching the following query: "adapterA AND running AND (OPERATION:* OR (OS:* AND CHANNEL:*)))".

When a new defect comes in, the user gets a list of light concepts to choose from. Then the user is presented with the test cases that match the searches for the concepts the user selected, possibly prioritized.

In some exemplary embodiments, the disclosed subject matter may be applied in the security domain. For example, it may be used in penetration testing for experts to share information about specific ways to compromise a system. The documents would be known attacks, for example. The tags would be specific details on how to make an attack manifest in a specific system. These tags may be entered by multiple experts, thus providing a means for sharing deep hands-on knowledge required for penetrating a system. Such knowledge is typically not included in the attack description and is very difficult to come by.

An Embodiment

In some exemplary embodiments, the clustering may be able to identify test cases which appear to perform similar actions on similar objects. The user could easily assert with a high confidence level that the test cases belonging to a cluster are related without having to read the entire free-text. Using statistics about the cluster's "closeness" and reading a select few test cases may be sufficient to comprehend the nature of the test cases of the cluster. Depending on the number and size of the clusters, this may even reduce the necessary work by an order of magnitude.

Our clustering solution assumes that each test cases may be decomposed into steps—assumption which is valid most of the time. As an example, each line may be considered as a step. Additionally or alternatively, each step may be numbered in the free-text.

The clustering utilizes a metric for comparing how close/far any two test cases are based on a custom metric:

First, the unique steps in all test cases are compared between themselves using a text distance algorithm. The results may be normalized.

Second, every pair of test cases is considered to find the best "match" of its steps. The results may be normalized.

A clustering algorithm may be used with the metric to partition the tests into clusters leaving also a bucket of unclustered tests. As an example only, the clustering algorithm may be Density-based spatial clustering of applications with noise (DBSCAN).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    obtaining a set of test cases, wherein the set of test cases are useful for testing a target system, wherein the set of test cases are stored electronically, wherein each test case of the set of test cases comprises free-text;
    defining one or more tags, wherein each tag of the one or more tags is associated with a query, wherein the query is configured, when applied, to determine possession of the tag or lack thereof with respect to a test case based on the free-text;
    applying queries associated with the one or more tags on the set of test cases to determine possession of the of the one or more tags for each test case of the set of test cases; and
    generating a functional model based on the set of test cases, wherein the functional model comprising for each tag of the one or more tags, a corresponding functional attribute, wherein the functional model comprising for each test case of the set of test cases, a coverage task, wherein a value of a functional attribute in a coverage task is indicative of possession of the corresponding tag by a corresponding test case.

2. The computer-implemented method of claim 1 further comprising:
    wherein said defining the one or more tags comprises defining a meta tag, wherein possession of the meta tag is dependent on possessions of tags;
    applying queries corresponding to the meta tag on the set of test cases to determine possession of the meta tag.

3. The computer-implemented method of claim 2, wherein the functional model comprising a hierarchical functional attribute corresponding to the meta tag, wherein a value of the hierarchal functional attribute in a coverage task comprises an identifier of one or more tags which caused the test case to possess the meta tag.

4. The computer-implemented method of claim 1 further comprising:
    performing test selection based on the functional model, wherein said test selection selects a subset of the set of test cases which provide a coverage level above a predetermined coverage threshold based on a coverage criteria, wherein the coverage criteria relates to at least one of said corresponding functional attributes.

5. The computer-implemented method of claim 1 further comprising: providing the functional model to a user to be verified and completed manually, whereby the functional model is defined in a semi-automatic manner.

6. The computer-implemented method of claim 1, wherein the queries of the one or more tags are text search queries on the free-text of the test cases.

7. The computer-implemented method of claim 1, wherein said defining comprises:
    performing topic summarization of the free-text to determine a set of topics; and
    defining for each topic of the set of topics a corresponding tag, wherein the tag is possessed by test cases having free-text that relates to the topic.

8. The computer-implemented method of claim 1, wherein said obtaining comprises:
    clustering test cases of a test suite based on the free-text to determine clusters of test cases; and
    selecting a cluster of the clusters as the set of test cases.

9. The computer-implemented method of claim 1 further comprises:
    clustering test-cases based on the tags to determine clusters of test-cases;

selecting a cluster of the clusters; and determining a functional model depicting the selected cluster of test cases.

10. The computer-implemented method of claim 1, wherein a functional attribute corresponding a tag is a Boolean functional attribute having a Boolean value explicitly indicating possession of the tag.

11. A computerized apparatus having a processor, the processor being adapted to perform:

obtaining a set of test cases, wherein the set of test cases are useful for testing a target system, wherein the set of test cases are stored electronically, wherein each test case of the set of test cases comprises free-text;

defining one or more tags, wherein each tag of the one or more tags is associated with a query, wherein the query is configured, when applied, to determine possession of the tag or lack thereof with respect to a test case based on the free-text;

applying queries associated with the one or more tags on the set of test cases to determine possession of the of the one or more tags for each test case of the set of test cases; and generating a functional model based on the set of test cases, wherein the functional model comprising for each tag of the one or more tags, a corresponding functional attribute, wherein the functional model comprising for each test case of the set of test cases, a coverage task, wherein a value of a functional attribute in a coverage task is indicative of possession of the corresponding tag by a corresponding test case.

12. The computerized apparatus of claim 11:

wherein said defining the one or more tags comprises defining a meta tag, wherein possession of the meta tag is dependent on possessions of tags;

wherein said processor is further adapted to perform: applying queries corresponding to the meta tag on the set of test cases to determine possession of the meta tag.

13. The computerized apparatus of claim 12, wherein the functional model comprising a hierarchical functional attribute corresponding to the meta tag, wherein a value of the hierarchal functional attribute in a coverage task comprises an identifier of one or more tags which caused the test case to possess the meta tag.

14. The computerized apparatus of claim 11, wherein said processor further adapted to perform test selection based on the functional model, wherein said test selection selects a subset of the set of test cases which provide a coverage level above a predetermined coverage threshold based on a coverage criteria, wherein the coverage criteria relates to at least one of said corresponding functional attributes.

15. The computerized apparatus of claim 11, wherein said processor is further adapted to provide the functional model to a user to be verified and completed manually, whereby the functional model is defined in a semi-automatic manner.

16. The computerized apparatus of claim 11, wherein the queries of the one or more tags are text search queries on the free-text of the test cases.

17. The computerized apparatus of claim 11, wherein said defining comprises:

performing topic summarization of the free-text to determine a set of topics; and defining for each topic of the set of topics a corresponding tag, wherein the tag is possessed by test cases having free-text that relates to the topic.

18. A computer program product comprising a computer readable storage medium retaining program instructions, which program instructions when read by a processor, cause the processor to perform a method comprising:

obtaining a set of test cases, wherein the set of test cases are useful for testing a target system, wherein the set of test cases are stored electronically, wherein each test case of the set of test cases comprises free-text;

defining one or more tags, wherein each tag of the one or more tags is associated with a query, wherein the query is configured, when applied, to determine possession of the tag or lack thereof with respect to a test case based on the free-text;

applying queries associated with the one or more tags on the set of test cases to determine possession of the of the one or more tags for each test case of the set of test cases; and generating a functional model based on the set of test cases, wherein the functional model comprising for each tag of the one or more tags, a corresponding functional attribute, wherein the functional model comprising for each test case of the set of test cases, a coverage task, wherein a value of a functional attribute in a coverage task is indicative of possession of the corresponding tag by a corresponding test case.

* * * * *